(12) United States Patent
Khibnik et al.

(10) Patent No.: US 11,054,340 B2
(45) Date of Patent: Jul. 6, 2021

(54) PARAMETRIC TRENDING ARCHITECTURE CONCEPT AND DESIGN

(71) Applicant: UNITED TECHNOLOGIES CORPORATION, Hartford, CT (US)

(72) Inventors: Alexander I. Khibnik, Glastonbury, CT (US); Gregory S. Hagen, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 505 days.

(21) Appl. No.: 15/990,200

(22) Filed: May 25, 2018

(65) Prior Publication Data

US 2018/0348087 A1    Dec. 6, 2018

Related U.S. Application Data

(62) Division of application No. 15/350,933, filed on Nov. 14, 2016, now Pat. No. 10,012,566.

(51) Int. Cl.
*G01M 15/14* (2006.01)
*F01D 21/10* (2006.01)
*F01D 21/00* (2006.01)

(52) U.S. Cl.
CPC .......... *G01M 15/14* (2013.01); *F01D 21/003* (2013.01); *F01D 21/10* (2013.01); *F05D 2220/32* (2013.01); *F05D 2260/80* (2013.01)

(58) Field of Classification Search
CPC ... G01M 15/14; F01D 21/003; F05D 2220/32
See application file for complete search history.

(56) References Cited

U.S. PATENT DOCUMENTS

| 6,466,858 | B1 | 10/2002 | Adibhatla |
| 6,606,580 | B1 | 8/2003 | Zedda |
| 6,643,570 | B2 | 11/2003 | Bangert |
| 6,909,960 | B2 | 6/2005 | Volponi |
| 7,216,071 | B2 | 5/2007 | Volponi |

(Continued)

OTHER PUBLICATIONS

A. Volponi and B. Wood, "Engine Health Management for Aircraft Propulsion Systems", NASNISHEM, 2005. (Year: 2005).

(Continued)

*Primary Examiner* — Rami Khatib
(74) *Attorney, Agent, or Firm* — Snell & Wilmer L.L.P.

(57) ABSTRACT

A method for foreign object debris detection in a gas turbine engine may comprise receiving, by a controller, a plurality of master configuration parameters, receiving, by the controller, a plurality of individual configuration parameters in response to the plurality of master configuration parameters, receiving, by the controller, a first time-series data from a database, pre-processing, by the controller, the first time-series data to generate a second time-series data, implementing, by the controller, an anomaly detector model, the anomaly detector model configured to generate a third time-series data, and implementing, by the controller, a foreign object debris (FOD) damage model, the FOD damage model receiving the third time-series data. The pre-processing the first time-series data, the implementing the anomaly detector model, and the implementing the FOD damage model may be defined by the plurality of individual configuration parameters.

11 Claims, 9 Drawing Sheets

(56) References Cited

U.S. PATENT DOCUMENTS

| | | |
|---|---|---|
| 8,074,498 B2 | 12/2011 | Agrawal |
| 8,204,671 B2 | 6/2012 | Agrawal |
| 8,256,277 B2 | 9/2012 | Khibnik |
| 8,424,279 B2 | 4/2013 | Rajamani |
| 8,459,103 B2 | 6/2013 | Khibnik |
| 9,010,198 B2 | 4/2015 | Rajamani |
| 2006/0047403 A1 | 3/2006 | Volponi |
| 2009/0112519 A1 | 4/2009 | Novis |
| 2019/0129404 A1* | 5/2019 | Celia ..................... G06N 7/005 |
| 2019/0146470 A1* | 5/2019 | Akkaram ........... G05B 23/0254 700/30 |

OTHER PUBLICATIONS

USPTO, Preinterview First Office Action dated Jun. 2, 2018 in U.S. Appl. No. 15/350,933.
USPTO, First Action Interview Office Action dated Mar. 13, 2018 in U.S. Appl. No. 15/350,933.
USPTO, Notice of Allowance dated May 9, 2018 in U.S. Appl. No. 15/350,933.

* cited by examiner

PARAMETRIC TRENDING ARCHITECTURE CONCEPT AND DESIGN

CROSS REFERENCE TO RELATED APPLICATIONS

This application is a divisional of, and claims priority to, and the benefit of U.S. patent application Ser. No. 15/350,933, filed on Nov. 14, 2016, and entitled "PARAMETRIC TRENDING ARCHITECTURE CONCEPT AND DESIGN" which is incorporated by reference herein in its entirety.

STATEMENT OF GOVERNMENT INTEREST

This disclosure was made with government support under contract No. N00019-13-C-0016 awarded by the United States Navy. The government has certain rights in the disclosure.

FIELD

The present disclosure relates generally to gas turbine engines, and more specifically, to systems and methods for monitoring the health of gas turbine engines.

BACKGROUND

Gas turbine engines may be subjected to severe instant or incipient damage as a consequence of Foreign Object Debris (FOD) ingestion. In order to mitigate the risk of FOD events, gas turbine engines undergo complex and time consuming periodic inspections. While FOD detection systems and sensors may reduce the frequency of inspections, they tend to generate an unacceptable level of false alarms. FOD detection systems may vary between various versions or updates. These various detection systems may include substantial overhaul of system architecture.

SUMMARY

Systems and methods for detecting foreign object debris damage in a gas turbine engine are disclosed. A method for foreign object debris detection in a gas turbine engine may comprise receiving, by a controller, a plurality of master configuration parameters, receiving, by the controller, a plurality of individual configuration parameters in response to the plurality of master configuration parameters, receiving, by the controller, a first time-series data from a database, pre-processing, by the controller, the first time-series data to generate a second time-series data, the pre-processing defined by the plurality of individual configuration parameters, implementing, by the controller, an anomaly detector model, the anomaly detector model configured to generate a third time-series data, the implementing the anomaly detector model defined by the plurality of individual configuration parameters, and implementing, by the controller, a foreign object debris (FOD) damage model, the FOD damage model receiving the third time-series data, the implementing the FOD damage model defined by the plurality of individual configuration parameters.

In various embodiments, at least one of the anomaly detector model and the FOD damage model may be configurable in response to at least one of the master configuration parameter and the individual configuration parameter. The implementing the anomaly detector model may include calculating, by the controller, the third time-series data, the third time-series data comprising an anomaly detector, wherein the anomaly detector is based upon the second time-series data. The third time-series data may comprise an anomaly detection signal. The implementing the FOD damage model may comprise determining, by the controller, that a FOD event has occurred based upon the third time-series data. The controller may determine that the FOD event has occurred based upon at least one of the master configuration parameter and the individual configuration parameter. The method may further comprise generating a health report (HR). The master configuration parameter may include at least one of a limit, a Boolean value, a coefficient, and a characteristic value. The pre-processing may cause the controller to at least one of: calculate a derived parameter, wherein the derived parameter is calculated using the first time-series data; evaluate an integrity of the first time-series data; evaluate a health of a debris monitoring sensor; clean the first time-series data; align the first time-series data with respect to time; define a filter for the first time-series data; or define a point of interest of the first time-series data.

A system for foreign object debris detection in a gas turbine engine may comprise a controller in communication with a memory. The controller may be configured to receive a plurality of master configuration parameters, receive a plurality of individual configuration parameters in response to the plurality of master configuration parameters, receive a first time-series data from a database, pre-process the first time-series data to generate a second time-series data, the pre-processing defined by the plurality of individual configuration parameters, generate a third time-series data, the generating the third time-series data defined by the plurality of individual configuration parameters, and determine that a FOD event has occurred based upon the third time-series data.

In various embodiments, the controller may implement an anomaly detector model, the anomaly detector model configured to produce an anomaly detection signal in response to receiving the second time-series data. The controller may implement a FOD damage model, the FOD damage model configured to produce a FOD damage estimate in response to receiving the third time-series data. At least one of the FOD damage model and the anomaly detector model may be configurable in response to at least one of the receiving the master configuration parameter and the receiving the individual configuration parameter. The calculating the third time-series data may include analyzing the second time-series data and generating the third time-series data comprising a vector of values including an anomaly detector. The controller may be further configured to report a foreign object debris (FOD) damage health report (HR), evaluate a health of a debris monitoring sensor, align the first time-series data with respect to time, define a filter for the first time-series data, or define a point of interest of the first time-series data.

A method for configuring a foreign object debris detection system may comprise adjusting, by a processor, a master configuration parameter in a master configuration table, replacing, by the processor, an existing master configuration table with the master configuration table, and receiving, by the processor, the master configuration parameter, wherein the master configuration table defines at least a portion of the foreign object detection system.

In various embodiments, the adjusting the configuration parameter may comprise adjusting at least one of a limit, a Boolean value, a coefficient, or a characteristic value. The providing the master configuration table may comprise providing at least one of a text file or a delimited values file.

The replacing the existing master configuration table with the master configuration table may include at least one of saving the master configuration table to a storage medium or deleting the existing master configuration table from the storage medium. The method may further comprise providing an individual configuration table in response to the master configuration table calling for the individual configuration table.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
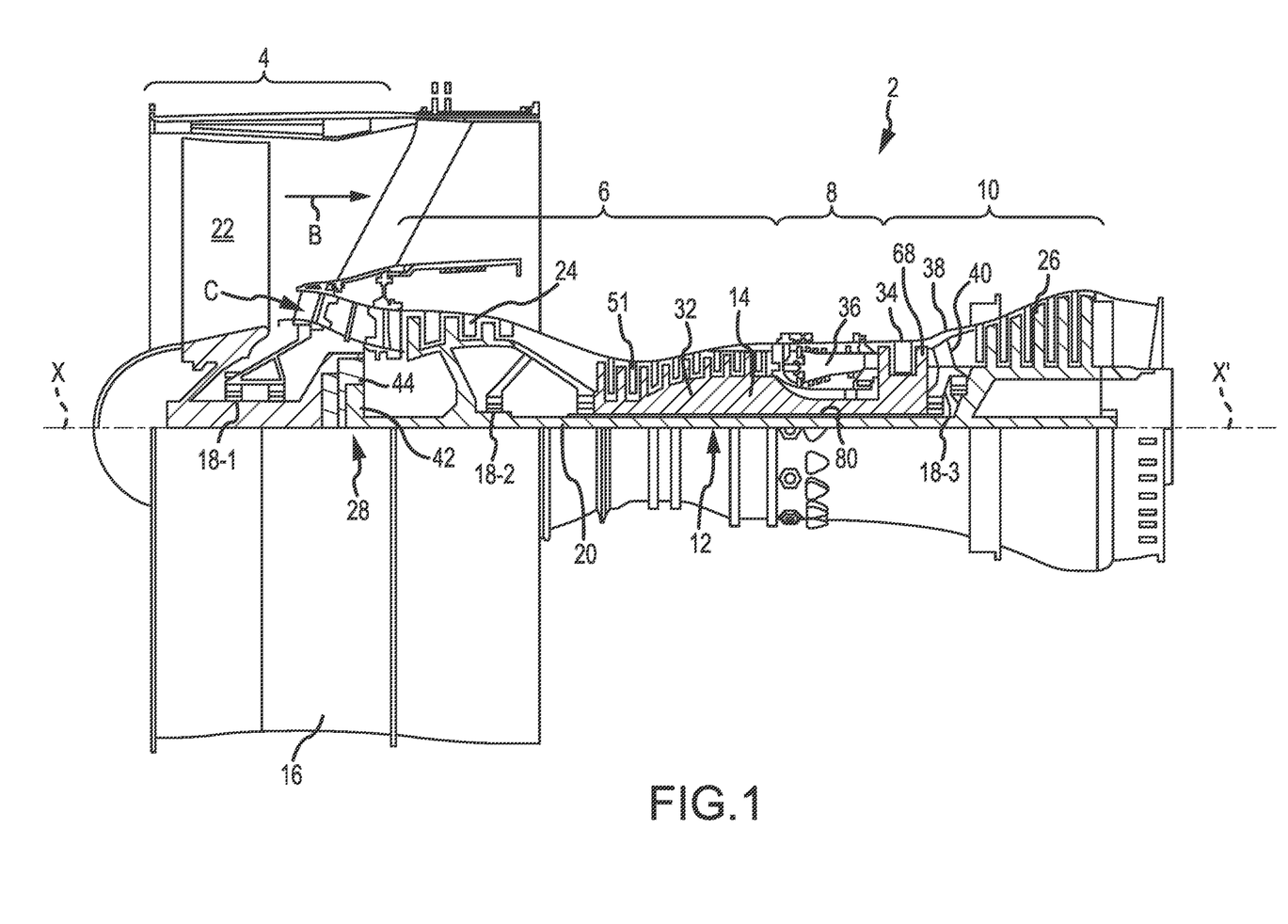
FIG. 1 illustrates a gas turbine engine, in accordance with various embodiments.

In various embodiments, and with reference to FIG. 1, an exemplary gas turbine engine 2 is provided. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 2:
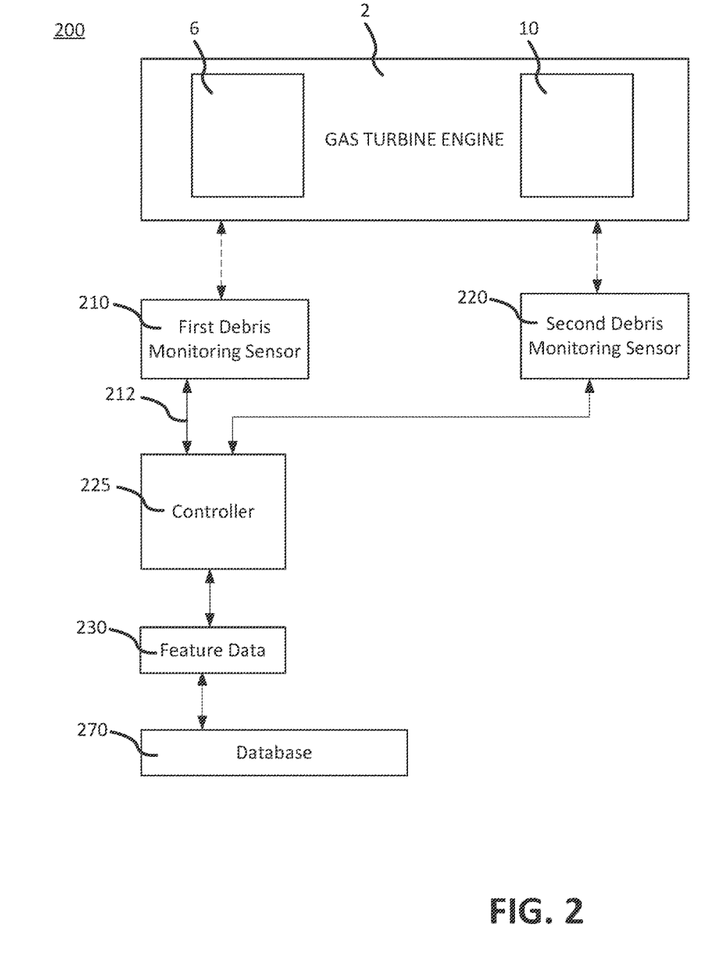
FIG. 2 illustrates a block diagram of a FOD detection system for a gas turbine engine, in accordance with various embodiments.

In various embodiments, and with reference to FIG. 2, a schematic view of a FOD detection system 200 is illustrated according to an embodiment. In various embodiments, FOD detection system 200 may comprise an on-board portion of a FOD detection system. Gas turbine engine 2 may be operatively connected to FOD detection system 200. Gas turbine engine 2 may be operatively connected to FOD detection system 200 using any suitable method disclosed herein and/or known in the art. FOD detection system 200 may comprise a single sensor or may comprise a plurality of sensors. In various embodiments, FOD detection system 200 comprises a first sensor (also referred to herein as first debris monitoring sensor) 210 and a second sensor (also referred to herein as second debris monitoring sensor) 220. Although illustrated as having first sensor 210 and a second sensor 220, FOD detection system 200 may include any number of sensors located at any location of gas turbine engine 2 (see FIG. 1). It is contemplated that any number of sensors may be located anywhere inside the gas turbine engine or outside of the gas turbine engine in its close proximity. The sensors may be excited by FOD or Domestic Object Damage (DOD). The sensors may be collocated. A first debris monitoring sensor, such as first sensor 210, may be proximate at least one of a fan section, a compressor section, a combustor section, or a turbine section of a gas turbine engine, such as gas turbine engine 2. First sensor 210 is proximate to and configured to monitor the compressor section 6 of gas turbine engine 2. Second sensor 220 is proximate to and configured to monitor the turbine section 10 of gas turbine engine 2.

In various embodiments first sensor 210 may be configured to provide a first sensor signal at a first rate, such as, for example, 1000 Hz. In various embodiments second sensor 220 is configured to provide a second sensor signal at a second rate. In various embodiments, the first rate and the second rate may be different or may be similar. In various embodiments, a sensor signal may comprise a voltage signal, a current signal, or any other suitable signal. In this regard, first sensor 210 may output sensor signal 212. Controller 225 may be in logical and/or electronic communication with first debris monitoring sensor 210 and second debris monitoring sensor 220. In various embodiments, the sensor signal 212 may undergo initial/primary data processing (also referred to herein as pre-processing), by controller 225, and be stored to database 270 as feature data (also referred to herein as first time-series data) 230. Such pre-processing may include, digitizing, compressing, averaging, filtering, or any other suitable operations. In various embodiments, feature data 230 may comprise a time-series data. Feature data 230 may comprise data stored at a third rate. The third rate may be less than the first rate. For example, feature data 230 may comprise a sampling rate of 1 Hz. However, in various embodiments, feature data 230 may comprise a sampling rate of between 0.01 Hz and 1 kHz, and in various embodiments, a sampling rate of between 1 Hz and 60 Hz.

In various embodiments, controller 225 and database 270 may be located on-board an aircraft. In this regard, controller 240 may be located within the aircraft's full authority digital engine control ("FADEC"), electronic engine control ("EEC") and/or located within the aircraft's health monitoring systems.

Figure 5:
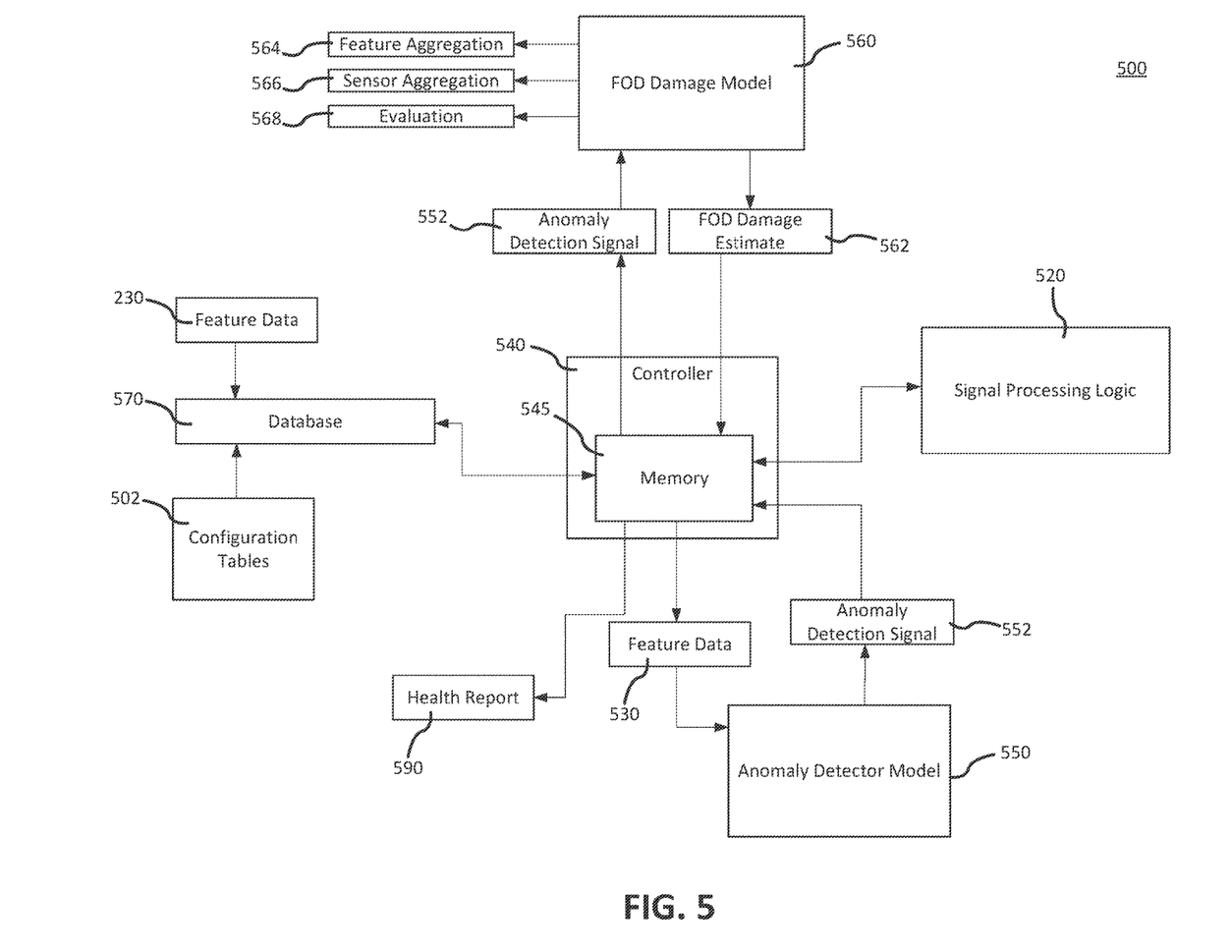
FIG. 5 illustrates a block diagram of an FOD detection system, in accordance with various embodiments.

With respect to FIG. 5, elements with like element numbering, as depicted in FIG. 2, are intended to be the same and will not necessarily be repeated for the sake of clarity.

With reference to FIG. 5, FOD detection system 500 is illustrated, in accordance with various embodiments. In various embodiments, FOD detection system 500 may include controller 540. Controller 540 may comprise any suitable processor capable of sending and receiving data, and performing operations. In various embodiments, FOD detection system 500 may comprise an off-board portion of a FOD detection system. In various embodiments, feature data 230 may be moved from database 270 (see FIG. 2) to an off-board database, or database located off of an aircraft, or database 570. In this regard, controller 540 may be located externally from an aircraft, in any suitable computer-based system. Controller 540 may be configured to execute instructions stored on a tangible, non-transitory computer readable medium, causing controller 540 to perform various operations. In various embodiments, controller 540 may also include any combination of processing circuits known in the art, such as one or more microprocessors, microcontrollers, digital signal processors, and/or programmable logic devices. However, although described as an off-board system, FOD detection system 500 may comprise an on-board portion of a FOD detection system.

Controller 540 may be in logical and/or electronic communication with anomaly detector model 550, FOD damage model 560, database 570, and/or processing logic 520. Controller 540 may be in logical and/or electronic communication using any method disclosed herein or known in the art, such as, for example, via wiring or radio frequency transmissions. In various embodiments, anomaly detector model 550 and/or FOD damage model 560 may be implemented in or by controller 540.

A processing logic 520 may be in logical and/or electronic communication with controller 540. In various embodiments, processing logic 520 may include instructions for various processing operations. In various embodiments, processing logic 520 may comprise a pre-processing logic. For example, instructions stored in processing logic 520 may be performed on feature data 230 to generate feature data 530. Stated another way, feature data 230 may be pre-processed before being sent to anomaly detector model 550. For example, processing logic 520 may include instructions for data cleaning, resampling, interpolation, normalization, data integrity detection, sensor health detection, parameter derivation, filtering, defining points of interest, etc. The details of these instructions will become more apparent herein with regards to the methods described in FIG. 3 and FIG. 4. In this regard, feature data 230 may optionally undergo these various processes before being sent to anomaly detector model 550. Thus, feature data (also referred to herein as second time-series data) 530 being sent to anomaly detector model 550 may be similar to feature data 230 or may comprise feature data 230 after having undergone various processing via processing logic 520. Pre-processing feature data 230 may improve the quality of the time-series data used for anomaly detection. Instructions included in processing logic 520 may be stored in a database, such as database 570 for example.

Anomaly detector model 550 may be in logical and/or electronic communication with a controller, such as controller 540, and receive feature data 530, via controller 540. Feature data 530 may comprise one or more features. A feature may comprise any one of a signal offset, signal broadband energy, count of spikes (pulses, steps) in the signal, characteristics of spikes (pulses, steps), modal amplitudes for a chosen set of modes, etc. Feature domain may comprise any of a real number, integer, Boolean, enumerable, or any other suitable value. Each feature may be represented in time-series (i.e., $x(t_1)$, $x(t_2)$, ... $x(t_n)$). Sampling points in time (i.e., $x(t_1)$, $x(t_2)$, etc.) may be equally spaced, approximately equally spaced, predefined time points, or feature based. A feature may include an anomaly which may correspond to a FOD event. For example, a FOD event may be manifested via a brief or persistent change of a feature value or slope (e.g. a spike in positive or negative direction, a positive-to-negative or negative-to-positive spike, a step in positive or negative direction, a slope increase or decrease). The feature may be analyzed by an anomaly detector model to determine if the feature includes an anomaly and its location in time.

In various embodiments, an anomaly detector model may process data values, which may comprise a feature, included in feature data 530 to detect anomalies. An anomaly detector may process data values included in feature data 530 one by one. Anomaly detector model 550 may be configured to produce an anomaly detection signal (also referred to herein as a third time-series data) 552 in response to receiving feature data 530. In various embodiments, an anomaly detector model may report to a controller, such as controller 540, detected anomalies via anomaly detection signal 552. Anomaly detection signal 552 may comprise a time-series vector comprising values referred to herein as anomaly detectors. In various embodiments, the time-series vector may comprise values, or anomaly detectors, sampled at the third or pre-determined rate.

In various embodiments, an anomaly detection signal 552 may comprise a vector having a series of Boolean values wherein a Boolean value of one (1) may indicate the detection of an anomaly. In this manner, anomaly detection signal 552 may comprise a vector of ones and zeros, in accordance with various embodiments. In various embodiments, an anomaly detection signal 552 may comprise a vector having a series of characteristic values corresponding to the occurrence or likelihood of an anomaly. In various embodiments, a characteristic value may provide an anomaly description. For example, controller 540 may analyze, via anomaly detector model 550, feature data 530 and may output a time-series signal (i.e., the anomaly detection signal 552, also referred to herein as an anomaly trend) whose values correspond to the occurrence of an anomaly at a given time. In this regard, an anomaly detector model 550 may receive a feature time-series signal (i.e., feature data 530) as an input and may send an anomaly time-series signal (i.e., anomaly detection signal 552) as an output.

In various embodiments, anomaly detector model 550 may generate a plurality of anomaly detection signals corresponding to different features. For example, a first anomaly detection signal may correspond to a signal derived from detecting signal offsets and a second anomaly detection signal may correspond to a signal derived from detecting signal broadband energy. In this manner, each feature may be processed individually via anomaly detector model 550. Thus, each feature may contribute its own independent "vote" or potential event indication, in FOD event detection.

In various embodiments, controller 540 may transmit anomaly detection signal 552 to a FOD damage model 560. FOD damage model 560 may then analyze the anomaly detection signal 552 and may produce a FOD damage estimate 562, or score. FOD damage model 560 may be configured to evaluate detected anomalies in feature data 230, or feature data 530, in order to detect FOD damage in a number of scenarios. For example, FOD damage model 560 may make a certain set of assumptions regarding how a FOD event can occur and represent itself in time history of feature data 530. Different FOD data scenarios may require employing different methods and limits for data processing for FOD detection or a different set of limits. As such, implementation of the use of various configuration parameters such as coefficients and limits may define models used within the trending software.

In various embodiments, a single feature may be used to determine a FOD event. For example, a single feature, such as spike detection, may be used to generate anomaly detection signal 552 and FOD damage model 560 may generate FOD damage estimate 562 based on this anomaly detection signal.

In various embodiments, FOD damage model 560 may implement feature aggregation logic 564. In this regard, a number of features may be used to determine a FOD event. For example, a number of anomaly detection signals 552 corresponding to anomalies detected using different features from a single sensor may be used to determine a FOD event.

In various embodiments, FOD damage model 560 may implement sensor aggregation logic 566. In this regard, a number of sensors may be used to determine a FOD event. For example, a feature detected at a first time from a first sensor may be used along with a corresponding second feature detected at a second time from a second sensor to determine a FOD event, wherein the first sensor and the second sensor may be collocated. In this regard, a first sensor may be located upstream of a second sensor and the features may be detected at different times corresponding to the time for a foreign object to travel from the first sensor to the second sensor.

In various embodiments, FOD damage model 560 may implement evaluation logic 568. In this regard, anomaly detectors, in the form of anomaly detection signal 552, may be evaluated to determine if a FOD event has occurred. Evaluation logic 568 may be implemented in order to determine the likelihood that a FOD event occurred. Evaluation logic 568 may indicate the magnitude or degree of a FOD event.

In various embodiments, a controller, such as controller 540, may be configured to receive the FOD damage estimate 562 from FOD damage model 560 and may report a FOD damage health report (HR) 590. In various embodiments, the FOD damage HR 590 may be reported in response to the FOD damage estimate being above a predetermined threshold. In various embodiments, the FOD damage HR 590 may be configurable in response to configuration parameters received by controller 540 from configuration tables 502.

In various embodiments, a database, such as database 570, may be configured to store and maintain data related to the calculation, monitoring, operation, and/or evaluation of at least one of anomaly trends, anomaly detection signals, actual parameters, anomaly detector models, FOD damage models, Sensor HRs, Data Integrity HRs, and/or FOD damage HRs. A database, such as database 570, may store and maintain data using any suitable method disclosed herein or known in the art and may be in logical and/or electronic communication with a controller, such as controller 540. A database, such as database 570, may be in logical and/or electronic communication using any method disclosed herein or known in the art, such as, for example, via wiring or radio frequency transmissions.

Controller 540 may be configured to perform the calculations associated with monitoring at least one foreign object debris (FOD) monitoring sensors. Controller 540 may be configured to perform the calculations associated with feature data 230, wherein calculating a FOD damage HR. A health report (HR) may include event time or interval, event type, event damaging index, impacted engine components, etc.

FOD detection system 500 may include configuration tables 502. In various embodiments, configuration tables 502 may include multiple columns for table elements such as "Attribute Name," "Data Format," "Description of Attribute," etc. Configuration tables 502 may comprise a text file, a delimited values file (such as a comma separated values file), or any other suitable file. Configuration tables 502 may include not only model coefficients and limits but may also include "switches" (i.e., Boolean values) which define models used within the trending software. Configuration tables may be stored in a database, such as database 570.

In various embodiments, various elements of FOD detection system 500 may be controlled via configuration tables 502. In various embodiments, FOD damage model 560 may be configurable in response to a change in configuration tables 502. In various embodiments, anomaly detector model 550 may be configurable in response to a change in configuration tables 502. In various embodiments, signal processing logic 520 may be configurable in response to a change in configuration tables 502. A configuration table approach tends to allow modifying the behavior of the FOD detection system 500 (including anomaly detector model 550, FOD damage model 560, and/or signal processing logic 520) by adding new configuration tables and pointing the process to use them instead of the old ones. Configuration tables tend to make it more flexible to run multiple data processing scenarios using the same input data. For example, each scenario may make a certain set of assumptions regarding how a FOD event can occur and represent itself in time history. Different FOD data scenarios may require employing different methods and limits for data processing for FOD detection or a different set of limits.

Figure 6:
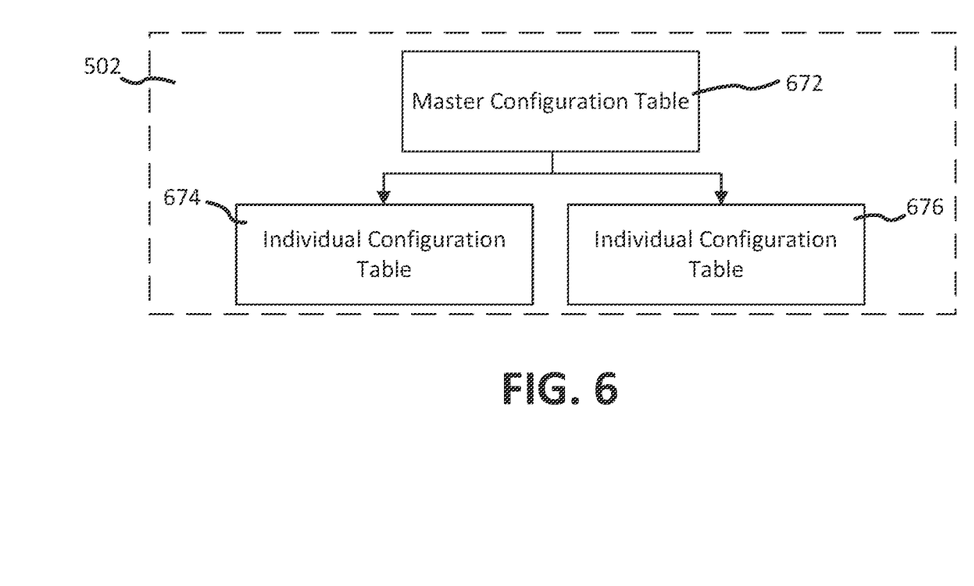
FIG. 6 illustrates master configuration tables for a FOD detection system, in accordance with various embodiments.

With additional reference to FIG. 6, configuration tables 502 are illustrated, in accordance with various embodiments. Configuration tables 502 may include a master configuration table 672 and a number of individual configuration tables, such as first individual configuration table (ICT) 674 and second ICT 676. Configuration tables 502 may include various configuration parameters which may be used to determine how feature data (i.e., feature data 230 and/or feature data 530) will be analyzed. For example, configuration tables 502 may determine how to interpret "features" in sensor data, be it through "data spike detection," "slope evaluation," "step detection," "threshold exceedance detection," etc. In this manner, configuration tables 502 may allow system configuration via one or more tables. With combined reference to FIG. 2, FIG. 5, and FIG. 6, a first ICT 674 may be used in response to FOD detection system 200 including a first sensor (i.e., first sensor 210) and a second ICT 676 may be used in response to FOD detection system 200 including a second sensor (i.e., second sensor 220). Stated another way, a first ICT 674 may be used to interpret feature data 230 from a first sensor and a second ICT 676 may be used to interpret feature data 230 from a second sensor. In this manner, hardware may function in a "plug-and-play" manner with the use of configuration tables making the FOD detection system 500 more flexible.

In various embodiments, a first ICT 674 may be used to provide configuration parameters for time alignment and a second ICT 676 may be used to provide configuration parameters for calculating anomaly detectors, for example. In this regard, master configuration table 672 may provide instructions for determining which individual configuration tables to use. In this regard, master configuration table 672 may point to individual configuration tables to be implemented. For example, master configuration table 672 may point to an individual configuration table by name or via a switch, such as a Boolean value. Individual configuration tables may provide individual configuration parameters which may define a certain model or algorithm to be implemented as well as comprise values such as, for example, limits, coefficients, etc. In this regard, a master configuration parameter may identify a collection of individual configuration parameters which may be coherently used to perform data trending and/or FOD detection. In various embodiments, master configuration table 672 may be used to determine a first FOD damage estimate 562 defined by a first set of individual configuration tables and may be used to determine a second FOD damage estimate 562 defined by a second set of individual configuration tables.

Figure 3:
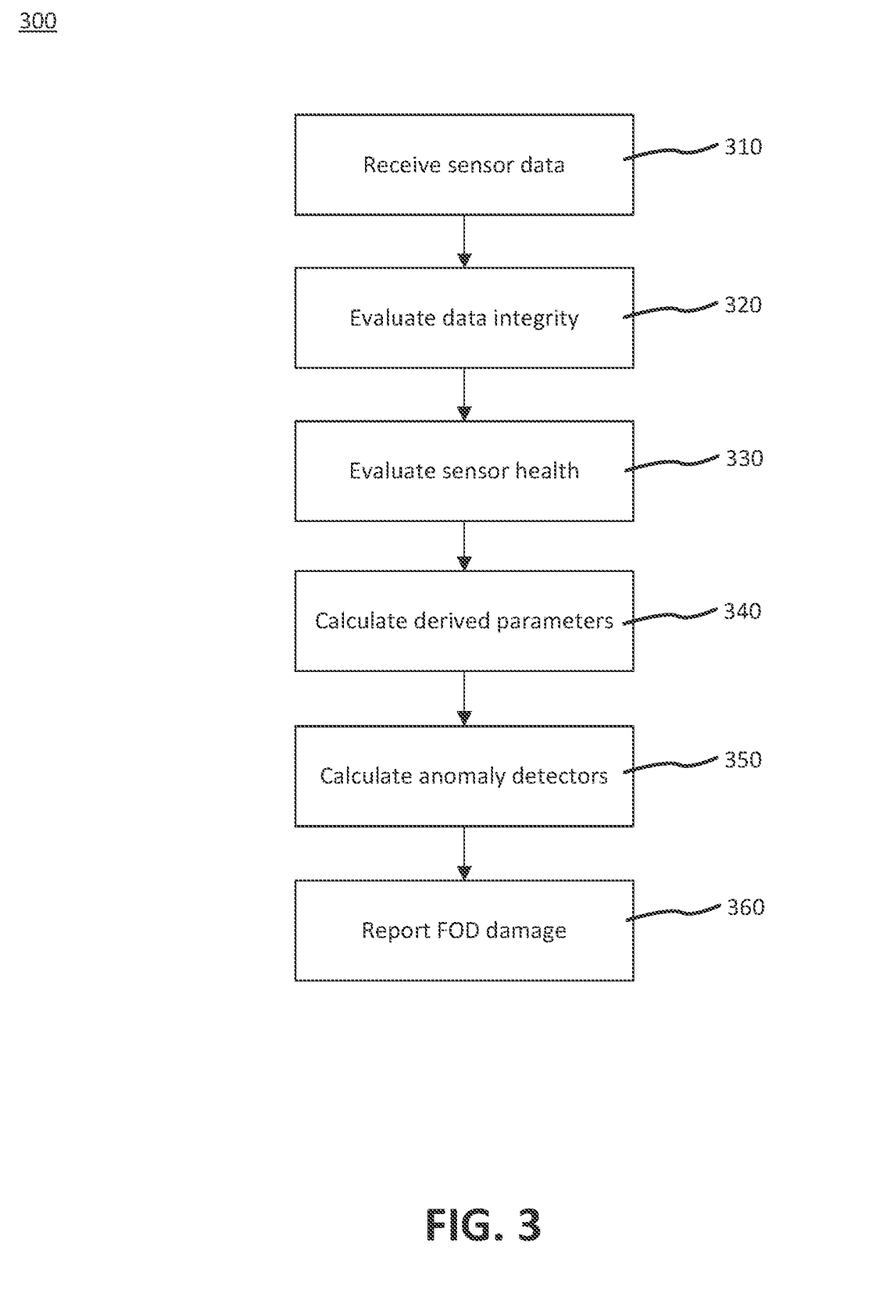
FIG. 3 illustrates a flow chart of a method for detecting FOD, in accordance with various embodiments.
Figure 4:
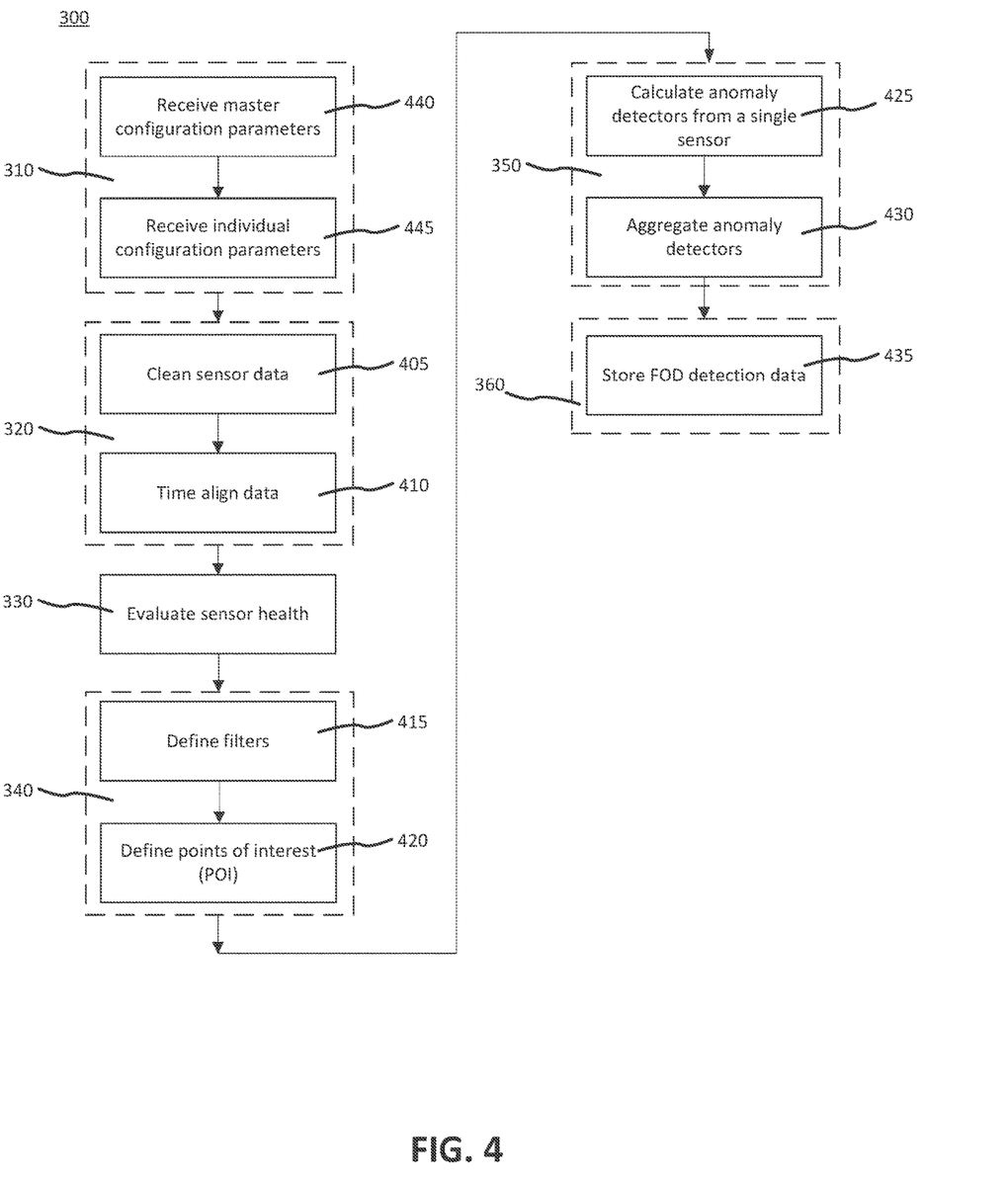
FIG. 4 illustrates a flow chart of a method for detecting FOD, in accordance with various embodiments.

In various embodiments, and with combined reference to FIG. 3, FIG. 4, and FIG. 5, a method 300 of foreign object debris detection may include implementing instructions stored in signal processing logic 520. Method 300 may comprise receiving sensor data (step 310) from one or more foreign object debris monitoring sensors. Step 310 may include receiving, by controller 540, feature data 230 obtained from a debris monitoring sensor in communication with a gas turbine engine 2. In various embodiments, feature data 230 may be stored to an on-board database and then moved to an off board database from which controller 540 may receive the feature data. Step 310 may include receiving, by controller 540, information or signals from database 570.

Step 310 may be divided into sub-step 440 of receiving and/or interpreting master configuration parameters and sub-step 445 of receiving and/or interpreting individual configuration parameters associated with master configuration parameters. For example, with additional reference to FIG. 6, master configuration table 672 may indicate to controller 540 to use first ICT 674 and second ICT 676. Sub-steps 440 and 445 may include receiving, by controller 540, information or signals from database 570 where master configuration table 672, first ICT 674, and/or second ICT 676 may be located. In this regard, master configuration parameters are stored on master configuration table 672 and individual configuration parameters are stored on individual configuration tables (i.e., ICT 674 and/or ICT 676). Individual configuration parameters may be received or obtained in response to the master configuration parameters.

In various embodiments, method 300 may comprise evaluating data integrity (step 320). In various embodiments, step 320 may comprise controller 540 evaluating feature data 530 to determine a data integrity status, such as, for example, whether the data is valid or sufficient for use by an anomaly detector model. Feature data 530 may contain information about the sensor from which it originated. This information may be used to compare or determine a nominal behavior of the sensor data. This information may be used for sensor health analysis or for establishing a baseline when determining sensor health. In various embodiments, controller 540 may be configured to evaluate the feature data 530 to determine a data integrity status, such as, for example, whether the data is valid or sufficient for use by an anomaly detector model, and may report a Data Integrity HR. In various embodiments, controller 540 may be configured to evaluate feature data 230 to determine a sensor health status, such as, for example, whether the sensor is damaged or disconnected, and may report a Sensor HR. A Data Integrity or Sensor HR may highlight a maintenance advisory for sensor troubleshooting and performing other actions in the case of data gaps, data loss, or other events that may indicate undependable sensor health In various embodiments, step 320 may further comprise controller 540 reporting a Data Integrity HR in response to the data integrity status. Step 320 may be divided into sub-step 405 of cleaning the sensor data. For example, in the event that feature data 230 may only include positive values, cleaning the sensor data may include adding negative values of feature data 230 using a default value or interpolated value. Cleaning may include conditioning data, such as feature data 230, for further analysis. Step 320 may be further divided into sub-step 410 of time aligning the actual parameter values for each debris monitoring sensor or for each type of data calculated during a primary data analysis step from a single debris monitoring sensor. In various embodiments, time alignment may include filling time gaps. In various embodiments, time alignment may include time aligning two or more distinct feature data 230 or feature data 530.

In various embodiments, method 300 may comprise evaluating sensor health (step 330). In various embodiments, step 330 may comprise controller 540 evaluating the feature data 230 to determine a sensor health status, such as, for example, whether the sensor is damaged or disconnected, and may include reporting a Sensor HR in response to the sensor health status.

In various embodiments, method 300 may comprise calculating derived parameters (step 340). Feature data 230 may include a number of time-series vectors, each resulting from a different data analysis of the data from a sensor, such as first sensor 210. Stated another way, feature data 230 may include a number of time-series vectors, wherein each of the time-series vectors comprises different types of calculations made from data received from a debris monitoring sensor. For example, a first vector may include data corresponding to threshold exceedances of the sensor signal, while another vector may include data corresponding to time averaged values of the sensor signal. It may be desirable to use any number of time-series vectors included in feature data 230 to calculate additional parameters. For example, a first time-series vector "A" may be added to another time-series vector "B" to calculate a third time-series vector "C". In various embodiments, any calculation or operation may be performed on one or more time-series vectors in order to derive a new or modified parameter. Step 340 may include normalization of data. In various embodiments, step 340 may include sub-step 415 defining filters. Sub-step 415 may include determining a start and stop point for a duration of time for which to analyze data. Step 340 may include sub-step 420 defining points of interest (POI). Defining points of interest (POI) may include selecting areas during a time of flight when FOD events are more likely to happen. Sub-step 420 may include determining anomalies in feature data 530 which may be of interest to further analyze.

In various embodiments, method 300 may comprise calculating anomaly detectors (step 350). As previously mentioned, anomaly detector model 550 may output an anomaly detection signal 552 comprising anomaly detectors which may aid in detecting various anomalies found in feature data 530. These anomaly detectors, or anomaly detection signals, may be scored to determine the likelihood of an occurrence of a FOD event. In various embodiments, each anomaly detection signal 552 may be scored individually or may be aggregated with anomaly detectors from a different sensor for an aggregate score. In this regard, step 350 may include sub-step 425 and sub-step 430. In various embodiments, sub-step 425 may include calculating anomaly detectors from a single sensor. In various embodiments, sub-step 430 may include aggregating anomaly detectors. Aggregating anomaly detectors from a number of sensors may increase the dependability and the fidelity of an HR. In various embodiments, step 350 may comprise controller 540 transmitting a number (n) of anomaly signals, where n≥1, such as, for example a first anomaly signal and a second anomaly signal, to the FOD damage model 560 and receiving a FOD damage estimate from the FOD damage model 560 in response to transmitting the anomaly signals. In various embodiments, step 350 may comprise monitoring and trending the anomaly detectors in order to calculate an overall 'score' (e.g. probability) for each anomaly detector.

Furthermore, although previously mentioned as aggregating anomaly detectors of different sensors, anomaly detector aggregation may include aggregating anomaly detectors from a similar sensor, but of different parameters. For example, a first anomaly signal may be calculated based upon a first parameter, such as threshold detection for example, and a second anomaly signal may be calculated based upon a second parameter, such as distortion analysis for example. In this regard, anomaly detectors from the first anomaly signal and the second anomaly signal may be aggregated to determine a FOD damage HR using a single sensor.

In various embodiments, step 350 may further comprise identifying FOD events, such as, for example, by a time history of anomalous data frames. In various embodiments, step 350 may further comprise validating FOD events against event parameters. In various embodiments, and as previously mentioned, the FOD damage model may comprise a sensor aggregation model. In various embodiments, step 350 may comprise applying a sensor aggregation model to the individual anomaly detector scores and FOD events to calculate a FOD damage estimate or calculated total FOD event score from the sensor aggregation model.

In various embodiments, method 300 may comprise reporting FOD damage (step 360). In various embodiments, step 360 may comprise controller 540 receiving the FOD damage estimate and comparing the FOD damage estimate to a predetermined detection threshold. In various embodiments, controller 540 may be configured to report a FOD damage HR in response to a FOD damage estimate exceeding a predetermined detection threshold. In various embodiments, step 360 may include sub-step 435 storing FOD detection data. In various embodiments, sub-step 435 may comprise storing FOD detection system data in database 570. In this regard, controller 540 may receive sensor data, such as a feature data 530 and transmit the data to the database 570. In various embodiments, controller 540 may be configured to transmit at least one of a time-series data, an anomaly detection signal, an anomaly trend, a FOD damage HR, a Sensor HR, or a Data Integrity HR to the database 570. Database 570 may receive and store the information transmitted by controller 540 using any suitable method described herein or known in the art.

Figure 7:
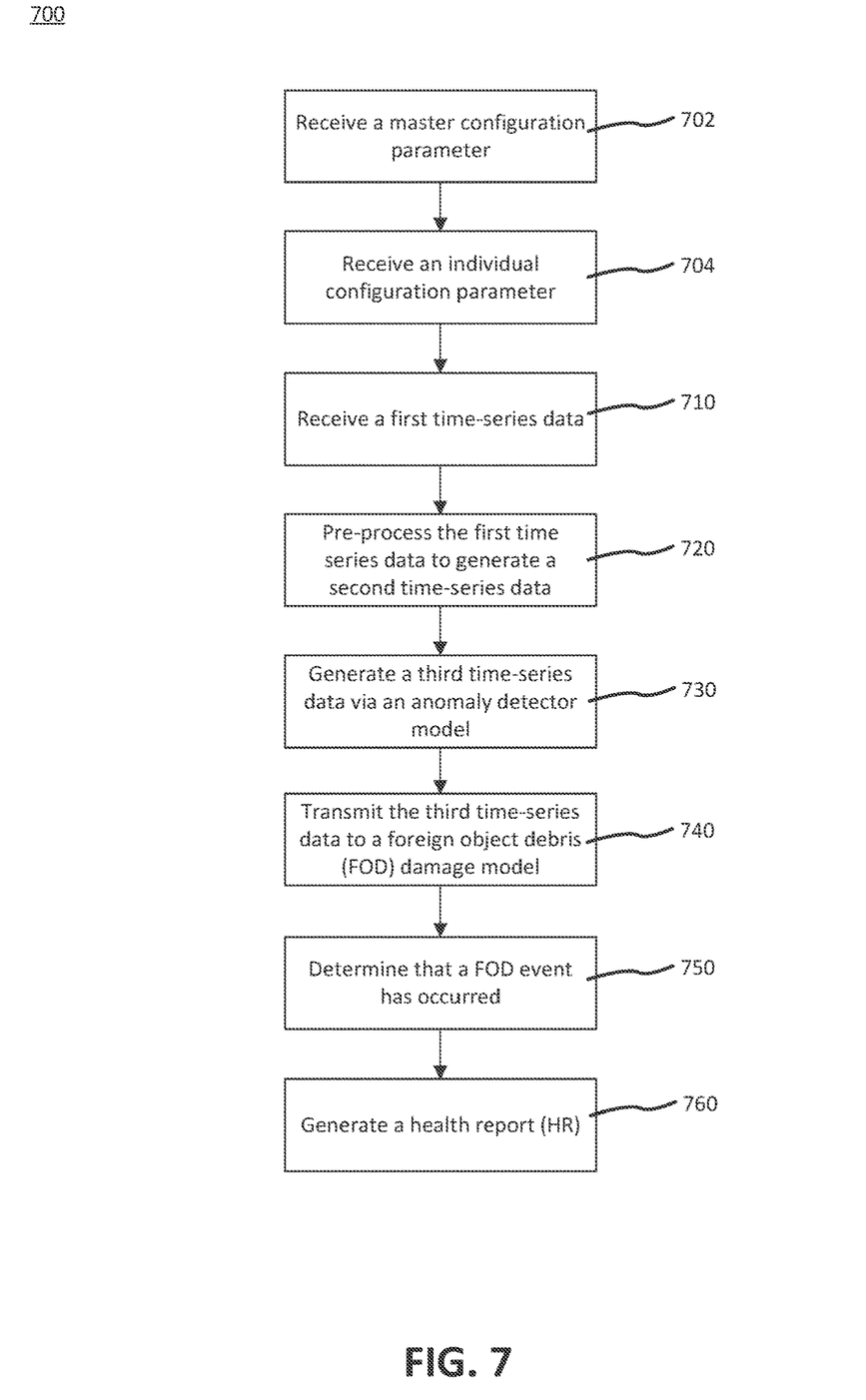
FIG. 7 illustrates a method for foreign object debris detection, in accordance with various embodiments.

After having provided various embodiments of a method for foreign object debris detection, with reference now to FIG. 7, a further embodiment of a method for foreign object debris detection is provided, in accordance with various embodiments. Method 700 includes receiving a master configuration parameter (see step 702). Method 700 includes receiving an individual configuration parameter (see step 704). Method 700 includes receiving a first time-series data (see step 710). Method 700 includes pre-processing the first time-series data to generate a second time-series data (see step 720). Method 700 includes generating a third time-series data via an anomaly detector model (see step 730). Method 700 includes transmitting the third time-series data to a foreign object debris (FOD) damage model (see step 740). Method 700 may include determining that a FOD event has occurred (see step 750). Method 700 may include generating a health report (HR) (see step 760).

In various embodiments, with combined reference to FIG. 5, FIG. 6, and FIG. 7, step 702 may include receiving, by controller 540, a plurality of master configuration parameters from master configuration table 672. Step 704 may include receiving, by controller 540, a plurality of individual configuration parameter from individual configuration table 674. Step 710 may include receiving, by controller 540, feature data 230. In various embodiments, the receiving the feature data 230 may be defined by the individual configuration parameters. Step 720 may include pre-processing feature data 230 to generate feature data 530. The pre-processing may be defined by the individual configuration parameters. Step 730 may include generating anomaly detection signal 552 via anomaly detector model 550. The generating the anomaly detection signal 552 may be defined by the individual configuration parameters. Step 740 may include transmitting, by controller 540, anomaly detection signal 552 to foreign object debris (FOD) damage model 560. The transmitting may be defined by the individual configuration parameters. Step 750 may include determining, by controller 540, that a FOD event has occurred based on data, such as anomaly detection signal 552 and/or FOD damage estimate 562, received from the FOD damage model 560. The determining may be defined by the individual configuration parameters. In various embodiments, Step 760 may include generating, by controller 540, a health report (HR) 590. The HR may be reported in response to a FOD event being detected. The generating the health report may be defined by the individual configuration parameters.

Figure 8:
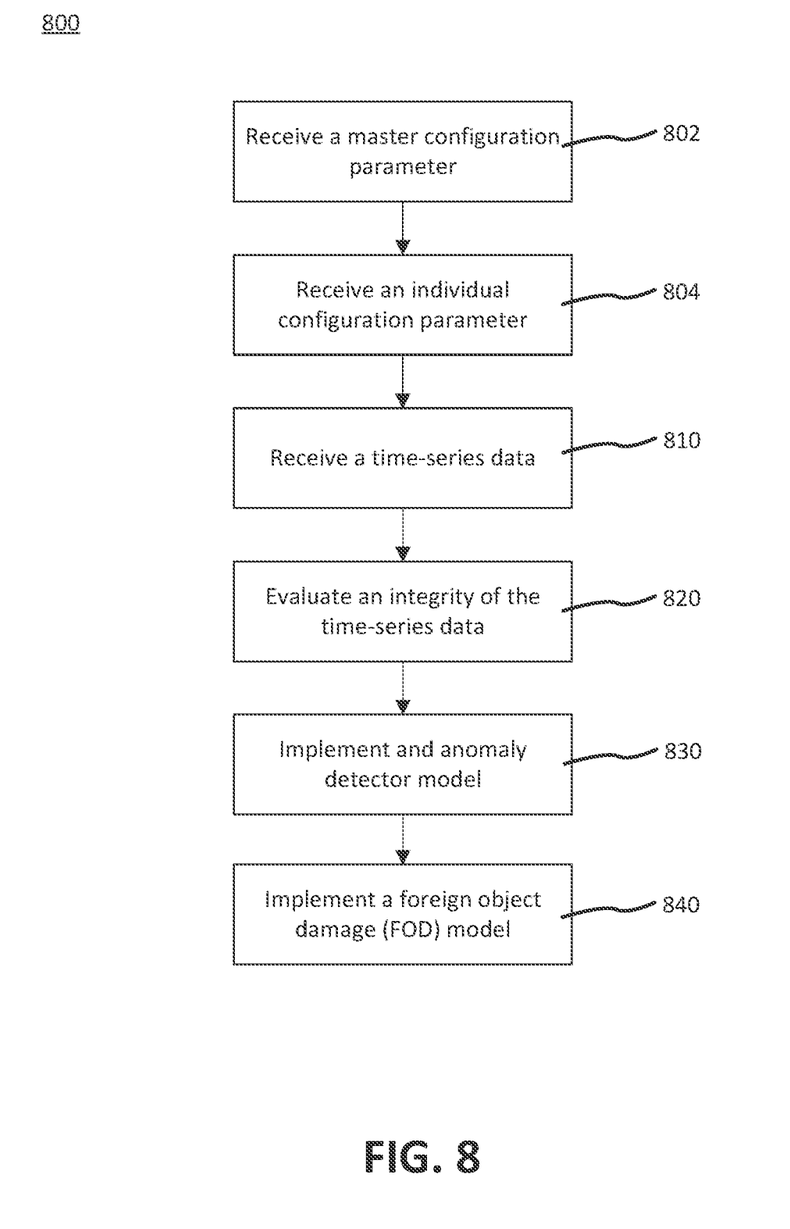
FIG. 8 illustrates a method for foreign object debris detection, in accordance with various embodiments.

Having described various operations configured to be performed by controller 230 (see FIG. 2), with reference now to FIG. 8, a further embodiment of operations performed by a controller included in a system for foreign object debris detection is provided, in accordance with various embodiments. Method 800 includes receiving a master configuration parameter (see step 802). Method 800 includes receiving an individual configuration parameter (see step 804). Method 800 includes receiving a time-series data (see step 810). Method 800 includes evaluating the integrity of the time-series data (see step 820). Method 800 includes implementing an anomaly detector model (see step 830). Method 800 includes implementing a FOD damage model (see step 840).

With combined reference to FIG. 5, FIG. 6, and FIG. 8, step 802 may include receiving, by controller 540, a plurality of master configuration parameters from master configuration table 672. Step 804 may include receiving, by controller 540, a plurality of individual configuration parameters from individual configuration table 674. The receiving the individual configuration parameters may be in response to the master configuration parameters. Step 810 may include receiving, by controller 540, feature data 230. The receiving the feature data 230 may be in response to the individual configuration parameters. Step 820 may be similar to step 320 (see FIG. 3). Step 830 may include implementing anomaly detector model 550 (see FIG. 5). The implementing the anomaly detector model 550 may be in response to the individual configuration parameters. Step 840 may include implementing FOD damage model 560 (see FIG. 5). The implementing the FOD damage model may be in response to the individual configuration parameters.

With reference now to FIG. 6, although explained as being used for addition of new sensors, ICT's may also be used for analysis and/or detection of various "features" using data from a single sensor. For example, a first ICT 674 may be used for peak detection for data from a first sensor and a second ICT 676 may be used for step detection for data from the first sensor.

Figure 9:
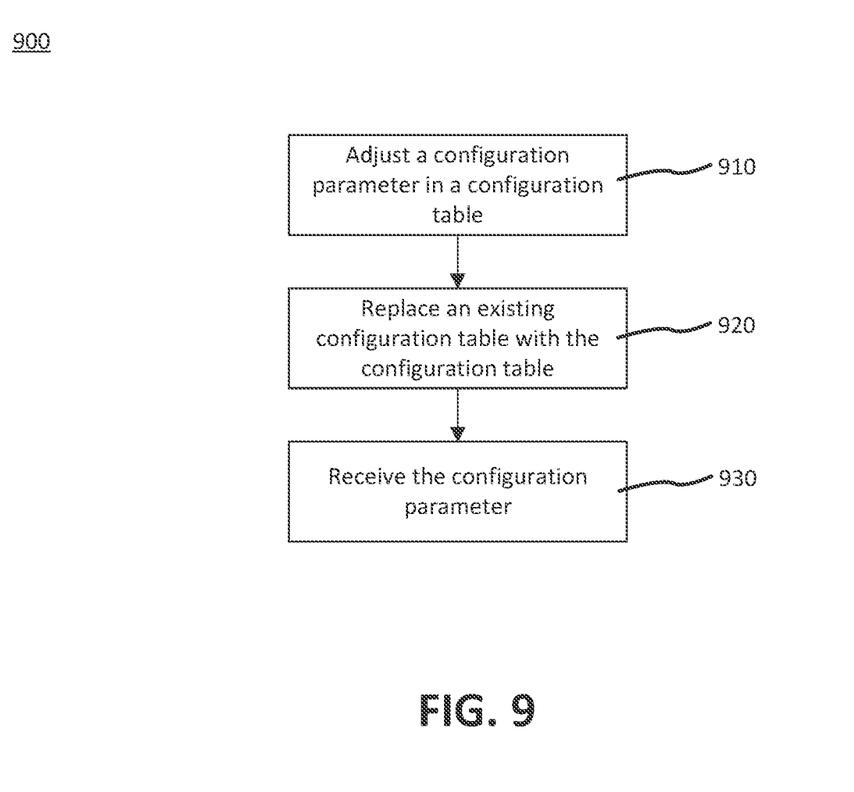
FIG. 9 illustrates a method for configuring a FOD detection system, in accordance with various embodiments.

In this regard, and with additional reference to FIG. 9, a method 900 for configuring a FOD detection system may include adjusting a configuration parameter in a configuration table (step 910). Method 900 may include replacing an existing configuration table with the configuration table (step 920). Method 900 may include receiving the configuration parameter (step 930).

With combined reference to FIG. 5, FIG. 6, and FIG. 9, step 910 may include adjusting, by controller 540, a master configuration parameter in a master configuration table 672. Controller 540 may perform the adjusting in response to user input or in response to an automatic algorithm programmed into memory or in response to any other suitable indication to adjust a configuration parameter. As previously mentioned, a configuration parameter may include a limit, a "switch", a coefficient, a characteristic value, or any other suitable parameter. Adjusting a master configuration parameter may include adjusting a value or values in the master configuration table such as adjusting a value in a text file or a delimited values file. Step 920 may include replacing, by controller 540, an existing master configuration table with master configuration table 672. Step 920 may include deleting the existing master configuration table from the storage device or memory. Step 930 may include receiving, by controller 540, the master configuration parameter. In various embodiments, it may be necessary to provide further individual configuration tables in response to the master configuration table calling an individual configuration table which is not already present in the storage device or memory. However, the individual configuration table corresponding to a certain process may already be presently stored in memory and thus the configuration of the FOD detection system may be successful in response to a change in the master configuration table.

With reference to FIG. 5 and FIG. 6, having described anomaly detector model 550 and FOD damage model 560 in accordance with various embodiments, it should be understood that said models are configurable according to master configuration table 672 and/or individual configuration tables (i.e., ICT 674). Stated another way, operations performed by said models may be based upon configuration parameters included in said configuration tables. In this regard, anomaly detector model 550 and FOD damage model 560 may be configurable in response to configuration parameters included in said configuration tables.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for foreign object debris (FOD) detection in a gas turbine engine, comprising:
    a controller in communication with a memory, the controller configured to:
    receive a plurality of master configuration parameters, wherein the plurality of master configuration parameters include at least one of a limit, a Boolean value, a coefficient, or a characteristic value;
    receive a plurality of individual configuration parameters in response to the plurality of master configuration parameters, wherein the plurality of individual configuration parameters include at least one of a limit, a Boolean value, a coefficient, or a characteristic value;
    generate a time-series data based upon the plurality of individual configuration parameters and sensor data received from a debris monitoring sensor for the gas turbine engine;
    determine that a FOD event has occurred based upon the time-series data and the plurality of individual configuration parameters; and
    generate a FOD damage health report for reporting the FOD event.

2. The system of claim 1, wherein the controller implements an anomaly detector model, the anomaly detector model configured to generate the time-series data based upon the plurality of individual configuration parameters.

3. The system of claim 2, wherein the anomaly detector model is configurable based upon the individual configuration parameters.

4. The system of claim 1, wherein the controller implements a FOD damage model, the FOD damage model is configured to produce a FOD damage estimate in response to receiving the time-series data.

5. The system of claim 4, wherein the FOD damage model is configurable based upon the individual configuration parameters.

6. The system of claim 4, wherein the plurality of master configuration parameters at least partially define the FOD damage model.

7. The system of claim 6, wherein the plurality of master configuration parameters are user-defined parameters.

8. The system of claim 1, wherein the controller is further configured to:
    receive a first time-series data from a database, wherein the first time-series data comprises data received from the debris monitoring sensor for the gas turbine engine; and
    pre-process the first time-series data to generate a second time-series data, the pre-processing defined by the plurality of individual configuration parameters;
    wherein the time-series data is a third time-series data generated based upon the second time-series data.

9. The system of claim 8, wherein the generating the time-series data includes analyzing the second time-series data and generating the time-series data comprising a vector of values including an anomaly detector.

10. The system of claim 8, wherein the controller is further configured to:
    evaluate a health of the debris monitoring sensor;
    align the first time-series data with respect to time;
    define a filter for the first time-series data; or
    define a point of interest of the first time-series data.

11. The system of claim 1, further comprising the debris monitoring sensor for the gas turbine engine.

* * * * *